United States Patent [19]

Losing

[11] 4,043,208

[45] Aug. 23, 1977

[54] CRANKING DEVICE FOR A SILO UNLOADER

[76] Inventor: Duane A. Losing, R.F.D. No. 1, Hawick, Minn. 56246

[21] Appl. No.: 719,359

[22] Filed: Sept. 1, 1976

[51] Int. Cl.$^2$ .......................... F16M 3/00; F16H 7/10
[52] U.S. Cl. .................................. 74/16; 74/242.13 R
[58] Field of Search ........................... 74/16, 242.13 R

[56] References Cited

U.S. PATENT DOCUMENTS

| 2,919,092 | 12/1959 | Chasar et al. | 74/16 X |
| 3,802,277 | 4/1974 | Pandjiris, et al. | 74/16 |

FOREIGN PATENT DOCUMENTS

| 493,956 | 6/1953 | Canada | 74/16 |

Primary Examiner—Leonard H. Gerin

[57] ABSTRACT

This device consists primarily of an adjustable leg supported gear box, to which is hinged, a base plate to which is secured an electric motor, which will drive the input shaft of the gear box, the output shaft of the gear box being secured to clutch means, the sleeve of which will connect with a silo unloader, so as to provide heavy duty means of operating the silo unloader.

4 Claims, 2 Drawing Figures

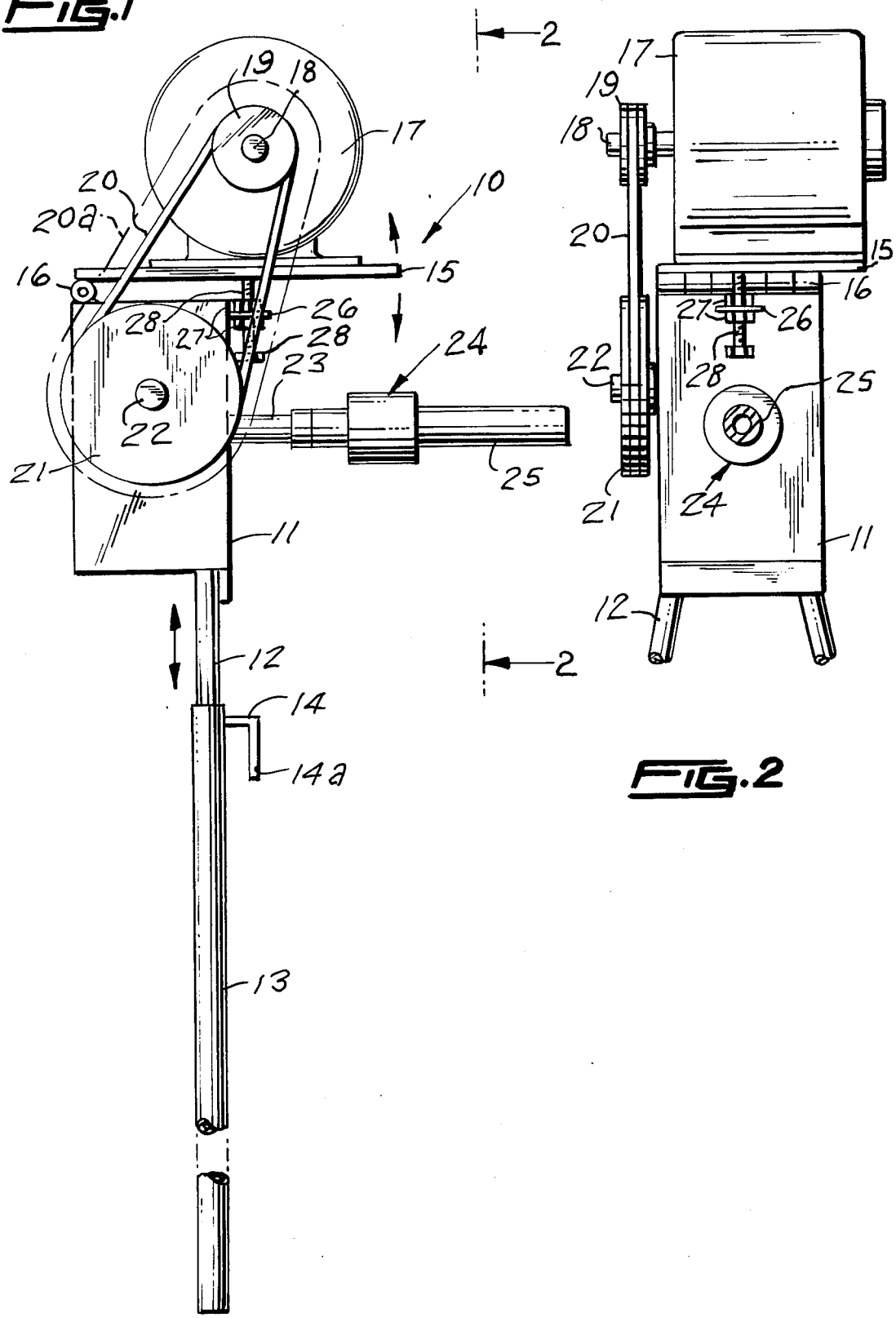

CRANKING DEVICE FOR A SILO UNLOADER

This invention relates to power driven devices, and more particularly to a cranking device for a silo unloader.

It is, therefore, the principal object of this invention to provide a cranking device for a silo unloader, which will be a heavy duty cranking means, so as not to burn out when cranking a silo unloader.

A further object of this invention is to provide a device of the type described, which will be portable and adjustable in height, and will include a clutch assembly, for effective operation thereof.

Other objects of the invention are to provide a cranking device for a silo unloader, which will be simple in design, inexpensive to manufacture, rugged in construction, easy to use and efficient in operation.

These and other objects will be readily evident upon a study of the following specification, and the accompanying drawing, wherein:

FIG. 1 is a side view of the present invention, shown in elevation, with the cover plate shown in phantom lines; and FIG. 2 is a cross-sectional view taken along the line 2—2 of FIG. 1.

According to this invention, a cranking device 10 is shown to include a gear box 11, which is of the reduction type. A pair of angularly spaced apart legs 12 of tubular structure, are fixedly secured, by welding or other means, to the bottom of the gear box 11. The pair of legs 12 are, one each, telescopingly received within tubular leg portions 13, and the height of the gear box 11 is adjustable by set screw 14 means, having a handle portion 14a. A rectangular base plate 15 is secured by hinge 16 means, to the upper portion of gear box 11, for a purpose which hereinafter will be described.

An electric motor, of suitable horsepower, has secured to its shaft 18, a pulley 19, which carries endless belt 20, the belt 20 engaging pulley 21 which is secured to shaft 22 of gear box 11, the shaft 22 being the input shaft of gear box 11. Safety guard means 20a is removably secured in a suitable manner (not shown) to device 10, so as to cover the pulleys 19, 21, and the belt 20. The low RPM output shaft 23 of gear box 11 is coupled by clutch assembly 24 to the sleeve 25, which couples the silo unloader to device 10.

A bracket 26 is fixedly secured to the exterior of gear box 11, by welding or other suitable means, above the output shaft 23, and a pair of nut fasteners 27, one on the top and the other on the bottom of bracket 26, threadingly receive bolt fastener 28, which abuts with the bottom side of base plate 15, so as to adjust the tension of the belt 20.

It shall be noted that motor 17 may be directly coupled to the input shaft 22 of gear box 11, rather than by the pulley 19, through the belt 20 and pulley 21.

While various changes may be made in the detail construction, it is understood that such changes will be within the spirit and scope of the present invention, as is defined by the appended claims.

What I claim is:

1. A cranking device for a silo unloader, comprising a reduction gear box, adjustable leg means secured to said gear box, providing elevation means therefor, motor base plate means adjustably secured to said gear box, pulley and belt means secured to said device for driving the output shaft of said reduction gear box and clutch means secured to one of the shafts of said reduction gear box.

2. The combination according to claim 1, wherein said adjustable leg means comprise a pair of angularly spaced apart, telescoping tubes, the tubes slideably received within the larger tubes, being fixedly secured to the bottom wall exterior of said gear box, said tubes being adjustable in elevation, by means of a set screw, and said base plate is of rectangular configuration and is secured, at one end, to a hinge which is fixedly secured to the top exterior surface of said reduction gear box.

3. The combination according to claim 2, wherein said motor is fastened stationary to said base plate, and said pulley and belt means includes a pulley fastened to said motor and a pulley fastened to the input shaft of said gear box, said pulleys removably receiving an endless belt, and the output shaft of said reduction gear box is secured within said clutch means, said clutch means being secured to sleeve means which couples to said silo unloader.

4. The combination according to claim 3, wherein bracket means is fixedly secured to the exterior of said gear box, above said output shaft thereof, said bracket means having secured thereto nut fastener means which threadingly receives a bolt fastener, said bolt fastener abutting with the bottom surface of said base plate, so as to elevate or lower said base plate for increasing or decreasing the tension of said belt of said device.

* * * * *